United States Patent [19]
Dellrud et al.

[11] 4,132,159
[45] Jan. 2, 1979

[54] NOISELESS AIR FLOW DEVICE AND METHOD

[75] Inventors: Rolf L. Dellrud; Torsten R. Hallberg, both of Trosa, Sweden

[73] Assignee: Luftkonditionering AB, Trosa, Sweden

[21] Appl. No.: 551,190

[22] Filed: Feb. 19, 1975

[30] Foreign Application Priority Data

Mar. 1, 1974 [SE] Sweden .............................. 7402782

[51] Int. Cl.$^2$ .......................... F24F 7/00; F24F 13/08
[52] U.S. Cl. ..................................... 98/42 R; 181/296; 181/56; 181/224; 98/32
[58] Field of Search ...................... 98/32, 42, 40 B, 20, 98/1 R, 39, 40 C, 38 B, 43 B; 181/33 L, 56, 44, 46; 62/427; 415/115, 116; 417/312

[56] References Cited

U.S. PATENT DOCUMENTS

| | | | |
|---|---|---|---|
| 1,032,794 | 7/1912 | Wolf | 181/56 X |
| 2,185,198 | 1/1940 | Huggins | 62/427 X |
| 2,278,581 | 4/1942 | Dexter | 98/43 |
| 2,654,305 | 10/1953 | Robertson | 98/40 B |
| 3,388,769 | 6/1968 | Martoia | 181/56 |
| 3,577,904 | 5/1971 | Lambert | 98/40 D |
| 3,660,979 | 5/1972 | Kamakura | 417/312 X |
| 3,726,202 | 4/1973 | Ahlberg | 98/32 |
| 3,802,327 | 4/1974 | Otsuka | 98/32 |

FOREIGN PATENT DOCUMENTS 518289 9/1953 Belgium ......................... 98/42

*Primary Examiner*—William E. Wayner
*Assistant Examiner*—William E. Topolcai, Jr.
*Attorney, Agent, or Firm*—Fred Philpitt

[57] ABSTRACT

For obtaining a noiseless or substantially noiseless process of a flow passing through a throttle or damper device, the flow is given a speed increase with increasing acceleration in the direction of flow. Further, at least a substantial part of the dynamic component of the energy state of the flow is quenched within or immediately after the device by means of a counter-directed flow having a similar dynamic component. The invention also concerns a throttle or damper device for such a noiseless or substantially noiseless process of a flow.

7 Claims, 9 Drawing Figures

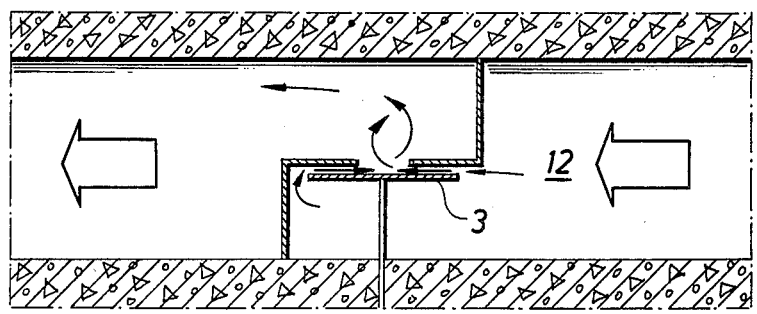
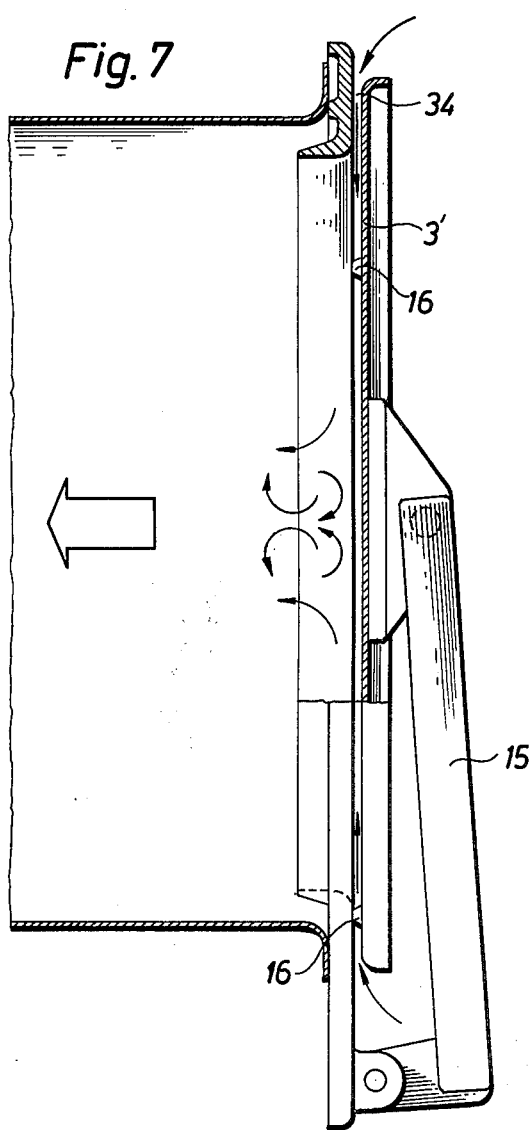

NOISELESS AIR FLOW DEVICE AND METHOD

A system for evacuating air from premises can consist of a central fan which is connected by means of ducts to the various locations. A relatively high pressure fall is often required at the ducts' terminal points in the premises, which is achieved by means of some form of terminal or end throttle or damper device. Among other things, this makes it easy to dimension the system, makes it insensitive to disturbance, for example thermal forces, and makes it easy to adjust to the desired flow in the various premises. It is also required that evacuation should be silent.

These two requirements, high pressure fall and low noise level, often conflict with one another. High pressure drops usually generate much noise. It has been attempted to solve this problem by various types of terminal throttle devices.

In a known solution in principle, a damper with laminar flow restriction is used, in which damper energy is lost through air friction against the walls of its small ducts or the like. The air speed can be kept moderate after the device, so that pressure variations, which can take the form of noise, are avoided. One disadvantage of this type of damper device is that it is easy for it to become clogged with dirt.

In another known type of damper device, a fall in impact pressure is produced, which has the advantages of not being clogged with dirt and of being easy to clean. It is, however, very difficult to keep noise generation in this device at a low level. In Swedish Pat. No. 348,547, a damper device of this type is described, comprising an opening provided with an inlet duct with a cross-section continuously decreasing in the direction of flow. In this way the inlet duct can have the form of a truncated cone or pyramid. According to another example, the inlet duct is designed as two cones telescoping into one another, between which the air passes.

Damper devices of this kind have the disadvantage that the air is thrown out at great speed in a downstream direction, which can on the one hand cause noise and on the other give rise to a greater length of throw than is desired. A damper device of this kind therefore requires a large free space on its downstream side, the provision of which is in many cases associated with great difficulty. It is often difficult to accomplish from a constructional point of view.

A long-known type of damper device in the form of a disc valve, for example of the kind described in Finnish lay-open print 44,285, causes a comparatively high noise level because the increase in speed produced in the damper device does not occur in a controlled manner. Air jets which collide with one another in the device because of the increase in speed are also allowed to collide with fixed items, so that noise is generated. Tests have shown that the fact that the valve disc's leeside is convex further contributes to this disadvantage. Experiments have shown that a disc which is convex in the said manner generates a large amount of noise, even if other preconditions for a low noise level in the damper device are met. Furthermore, the valve disc's periphery is so designed that an increase in noise generation is caused in the gap between it and the outside of the outlet air duct.

Other previous methods and apparatuses are described in U.S. Pat. Nos. 1,863,943, DOS 2,248,492 and French Pat. No. 911,477.

The present invention is based on the surprising discovery that a substantially wholly noiseless process can be achieved in a device of the kind here under concern if it is ensured that it meets certain conditions as concerns the flow passing through the device.

The method according to the invention comprises the steps of imparting to a flow, when passing it through a throttle or damper device, an increase in speed with increasing acceleration in the direction of flow, and quenching at least a substantial part of the dynamic component of the energy state of the flow so generated. The quenching is effected by means of a flow that has a similar dynamic component but the reverse direction. The dynamic components are quenched within or immediately after the throttle or damper device.

The noiseless process is obtained by effecting quenching by means of a counter-directed flow, and in such a manner that the quenching does not encounter any fixed object.

In practice it is preferred that the resulting flow having a greatly reduced speed or dynamic component is led or carried off in a direction which differs from the original flow direction and the delivery direction of the counter-directed flow.

The resulting flow can, for example, be led or carried off in a direction substantially at right angles to a plane in which the flow and the counter-directed flow are supplied.

The increased acceleration imparted to the flow can, according to one embodiment, be effected by imparting a whirling or rotational movement to the flow and by quenching a substantial part of the dynamic component by means of a flow in an opposite direction to such whirling or rotational movement.

In one embodiment, the flow is given increasing acceleration by a combined rotational and translation movement, for example a helical movement, in addition to which the main part of the dynamic component is quenched by a counter-directed movement having a corresponding dynamic component.

According to an alternative embodiment, the flow is supplied in a plane in a radial direction towards a central point, reciprocal quenching of the main part of the dynamic component being effected by radial part-flows counter-directed to one another.

In this way, the flow can be supplied in the form of part-flows directed at right angles to a symmetry line so that reciprocal quenching of some of the flows' dynamic components is effected.

Quenching of the dynamic component can also be accomplished by part-flows which correspond to one another and are directed towards a point of stagnation, a stagnation line or a stagnation area of a total flow formed by these.

The invention also refers to a throttle or damper device for applying the method according to the invention, the main characteristics of this device being set out in the claims.

A throttle or damper device according to the invention is in principle of the impact pressure fall type, through which the advantages offered by this can be obtained. The disadvantage of the great throw length of damper devices of this type previously known is eliminated by causing the air jets, according to the invention, to collide with one another in such a manner that they lose most of their impulse or dynamic component. The air-air collision in this case occurs silently, in contrast to for example a collision between air and an object, causing so-called blowing-in noise.

A theoretical explanation of the noiseless process, which can be demonstrated in practice by application of the invention, lies in the fact that when applying the invention throttling or dampening first occurs by converting the flow's available total pressure into a higher dynamic pressure with consequent static pressure reduction, whereupon the higher dynamic pressure is quenched. This was in fact proposed earlier. According to the present invention, however, it has been demonstrated that this process can be effected in a non-noise-producing manner if the process is divided into the two part-processes of 'silent' speed increase followed by 'silent' energy quenching.

The 'silent' speed increase is effected by providing the air with a continuous speed increase by passage through a throttle or damper device forming part of a duct designed in a special manner. The speed increase can be effected in such a manner that each air particle is given a monotonous increasing acceleration, producing perfect, non-turbulent lines of flow.

To permit reasonable dimensions of the damper device, the process can, however, be commenced with high acceleration followed by a subsequent reduction, provided that the process occurs within the speed interval where noise production is at a low level.

The silent energy quenching in accordance with the second stage of the process is effected by utilizing the air's properties to 'turbulate' without disturbance in an, in practice, noiseless manner. Thus, quite simply air jets with the same 'impulse vectors' but of opposing direction can be allowed to encounter one another, so obtaining a quenching. This must, however, be effected in a controlled manner, since air jets of a certain speed encountering fixed objects can produce great noise.

Further aspects of the invention will be apparent from the following description of some embodiments thereof, wherein reference is made to the accompanying drawings.

FIG. 6 shows an air duct within which a throttle or damper device according to the invention is located.

FIG. 7 shows a damper device for a cooker hood.

Figure 1:
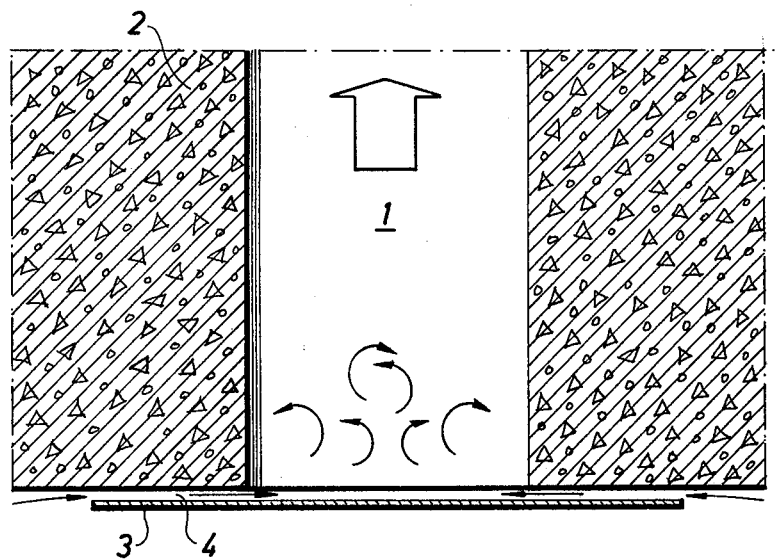
FIG. 1 shows a throttle or damper device according to the invention fitted to an outlet air duct.
Figure 8:
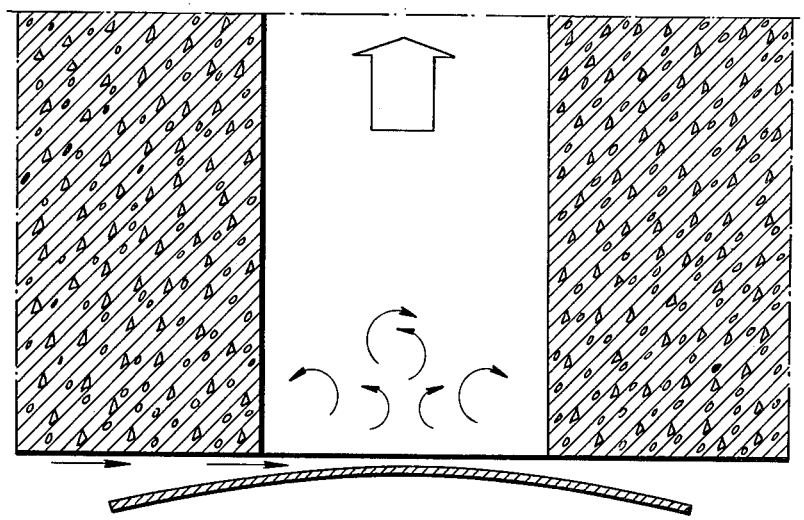
FIG. 8 shows a convex disc arrangement in accordance with this invention.

In FIG. 1, reference numeral 1 indicates an outlet air duct in a concrete wall 2. In front of the duct is a throttle or damper device in the form of a plane disc 3. The disc 3 has a larger outer dimension than the inner dimensions of the duct, so that a gap 4 of a pre-determined width or depth is formed between the disc's outer periphery and the restricting wall of the duct. The restricting side of the gap 4 of the disc 3 is plane or convex (see FIG. 8) and without irregularities.

The disc can, for example, be circular or rectangular. The gap's width amounts to about 1/10th of the disc's diameter or diagonal measurement. The gap's height or depth amounts to about 1.3 mm.

During the oulet air's passage through the gap 4, the flow will have imparted to it an increase in speed, with increasing acceleration in the direction of flow. The dynamic components of the part-flow directed from various sides towards a central point will, however, quench one another, whereupon the resulting flow, having a substantially quenched dynamic component, is substantially carried off wholly without noise in the direction of the duct.

Figure 2:
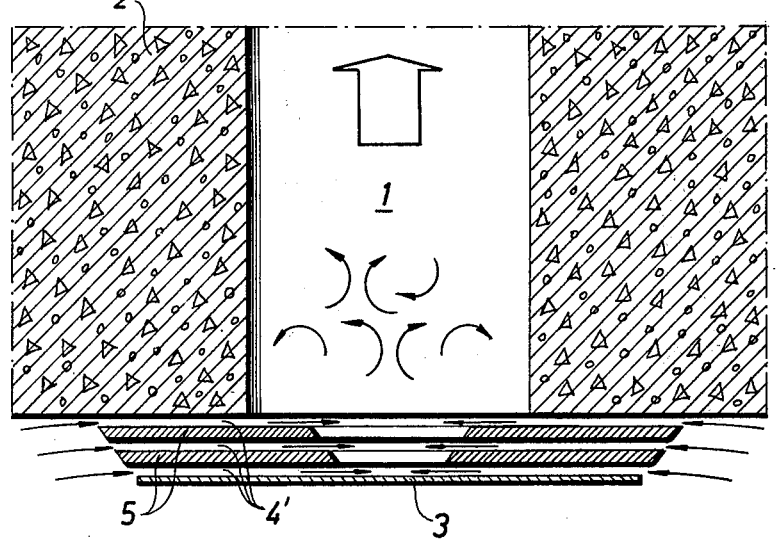
FIG. 2 shows a modification of the device according to FIG. 1.

FIG. 2 shows a modification which, in an area of substantially the same or smaller diameter, permits the passing of a greater flow. The disc 3 is here located at a greater distance from the concrete wall 2. The gap between the disc and the wall is, however, divided into three sub-gaps 4 by means of partitions 5. The inner edges of the partitions are displaced outwards from one another in the direction of the outlet air ducts, forming an expanding area in the direction of the air flow conducted away, in which quenching takes place.

The disc 3 shown in FIGS. 1 and 2 can appropriately be supported by an outer or inner holding device (not shown) which does not come into contact with the accelerating air flow and does not therefore result in noise generation.

The disc 3 shown in FIG. 2 can, in the same way as that shown in FIG. 1, be circular, rectangular, square or polygonal.

Figure 3:
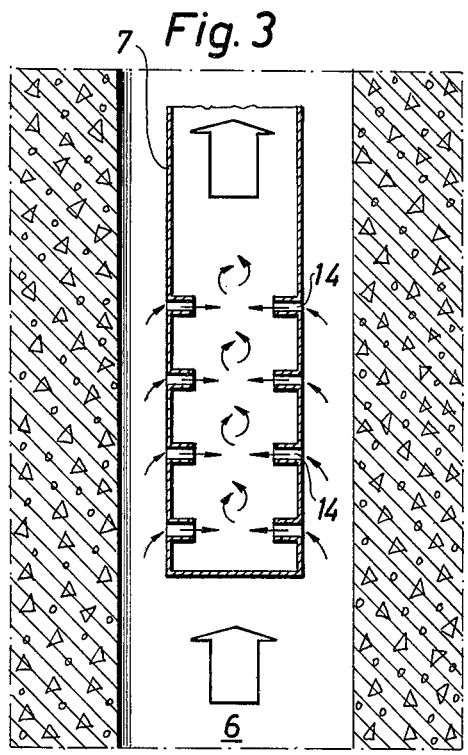
FIG. 3 shows a throttle or damper device according to the invention fitted in an air duct.

In FIG. 3, reference numeral 6 indicates an air duct in which is located an interior throttling or dampening pipe 7. This displays a number of gaps 14, the number depending upon which resulting flow is to be obtained. The distance between the gaps 14 must be carefully chosen so as not to form an air resonator.

Figure 4A:
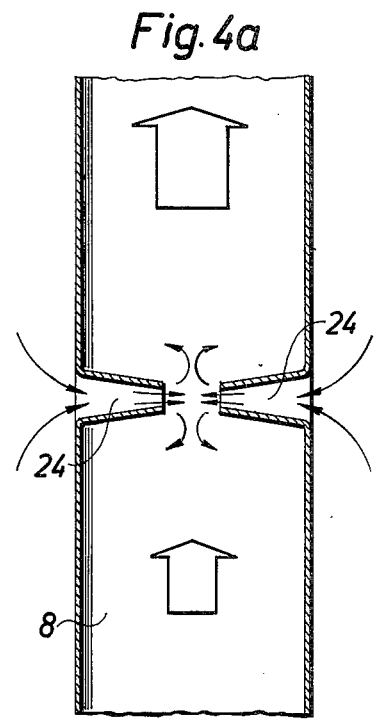
FIGS. 4a and 4b are a section through and a plan view of an air pipe or duct provided with a throttle or damper device according to the invention.
Figure 4B:
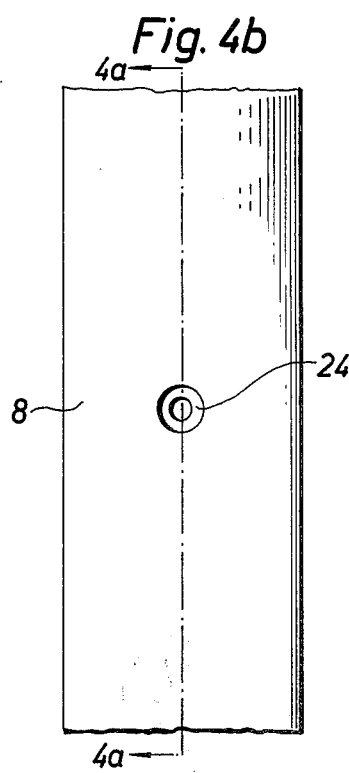

FIGS. 4 and 4b show a main duct 8, such as an outlet air duct, made for example of plate. The duct has two opposing openings narrowing inwards, which serve as for example an outlet air device and thus provide noiseless throttling in accordance with the principle of the invention.

Figure 5:
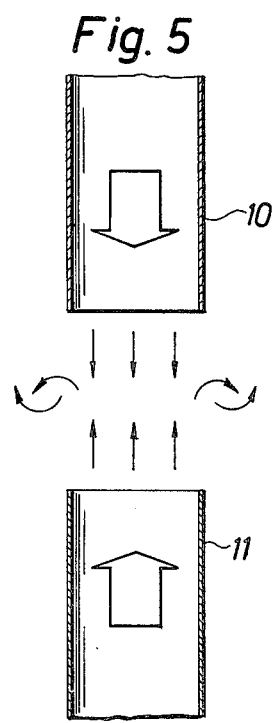
FIG. 5 is an outline diagram illustrating how reciprocal quenching of the dynamic components of two counter-directed air flows can be effected.

FIG. 5 is an outline diagram illustrating how high flow speeds can be quenched in a small volume. This Figure does not show how the flow acceleration is effected, but merely how two speed vectors can quench or annihilate one another. Two pipes 10 and 11 are provided coaxially, with their ends at a distance from one another. Two counter-directed flows are fed through the pipes. In the space between the pipes, reciprocal quenching of the flows' dynamic components takes place. Conducting away of the resulting flow can then be effected in any desired direction.

FIG. 6 illustrates an arrangement of substantially the same type as in FIG. 1. The plate 3 in this case is, however, provided within an air duct 12. There is here therefore a pressure difference between parts of a duct instead of between a large space and a duct as is the case in FIG. 1.

The plate 3 can in this case be said to serve as a seat valve in the duct 12. The drawing thus illustrates an example of an application with a silent valve device within a duct.

FIG. 7 illustrates a method of using in a special product the basic concept behind the invention. FIG. 7 illustrates, thus, a damper arrangement for the air duct of a cooker hood air duct containing a peripheral collar. A damper 3' is provided on a flexible arm 15 which is so fixed that it forms no obstacle to a supplied air flow.

The damper 3' consists of a circular disc having peripheral lugs 16 so arranged that a gap 34 of the correct dimensions is obtained between disc 3' and the collar. The width of the gap is 1/20th, and preferably 1/10th of the disc's diameter or diagonal measurement, the gap's height or depth being less than 2 mm and preferably amounts to about 1.3 mm.

In tests carried out with a cooker hood of the type shown in FIG. 7, it was established that no noticeable noise generation occurs.

It is realized that many other variations of what is described above are possible within the framework of the basic concept of the invention as defined in the appended claims.

We claim:

1. A method of obtaining a noiseless or substantially noiseless air flow passing through a throttle or damper device which comprises
    (a) forming the flow of air entering the throttle or damper device into a plurality of air streams that converge toward one another,
    (b) increasing the speed of said air streams at a constant or increasing acceleration as they converge toward each other and as they enter the throttle or damper device — but maintaining the flow of said streams non-turbulent,
    (c) quenching at least a substantial portion of the dynamic forces of the accelerating and converging air streams by directing said air streams against each other at an angle approximating 180°, whereby a resulting air mass with a strongly reduced dynamic component results, and
    (d) carrying off the resulting air mass resulting from step (c) in a direction different from the plane of flow of the converging air streams.

2. A method according to claim 1 wherein the flow of the non-turbulent converging air streams is radially towards a central point.

3. A throttle or damper device for the noiseless or substantially noiseless flow of air therethrough, said device comprising a collar and a disc connected with the duct, and including a restricted passage means in which an air flow undergoes a speed increase with constant or increasing acceleration in the direction of flow, said restricted passage means being so formed that the air flow undergoes a speed increase without substantial turbulence and without obstacles in the form of rigid bodies in the flow path within or adjacent the area in which the speed increase takes place, at least a substantial part of the dynamic component of the energy states of the flow being quenched within or near the throttle or damper device by means of mutually counter-directed portions of the total flow, thus forming a resultant flow having a greatly reduced dynamic component which is carried off in a direction which differs from the flow direction of the counter-directed part-flows, said disc being movable between a position covering the duct and an open position, wherein the disc has larger outer dimensions than the duct's inner dimensions, so that between the disc's outer edge and the collar said restricted passage means is formed, its width amounting to at least 1/20th of the disc's diameter, the height or width of the restricted passage means being less than 2 mm and the disc's side facing the restricted passage means being plane.

4. A throttle or damper device as claimed in claim 3 wherein the height of said restricted passage means amounts to about 1.3 mm.

5. A throttle or damper device according to claim 3 wherein the disc and/or the collar have a lug determining the correct height or depth of said restricted passage.

6. A throttle or damper device as set forth in claim 5 wherein the walls of the restricted passage means consist of inward-bending parts of the duct's periphery.

7. A throttle or damper device according to claim 3 for an outlet air duct comprising a collar and a disc connected with the duct, said disc being movable between a position covering the duct and an open position, wherein the disc has larger outer dimensions than the duct inner dimensions, so that between the disc outer edge and the collar a restricted passage means is formed, which width amounts to at least 1/20th of the disc diameter, the height or depth of the restricted passage means being less than 2 mm and the disc side facing the restricted passage means being convex.

* * * * *